No. 687,384. Patented Nov. 26, 1901.
M. P. OSBOURN.
DIRT TRAP FOR STEAM HEATING SYSTEMS.
(Application filed May 14, 1901.)
(No Model.)
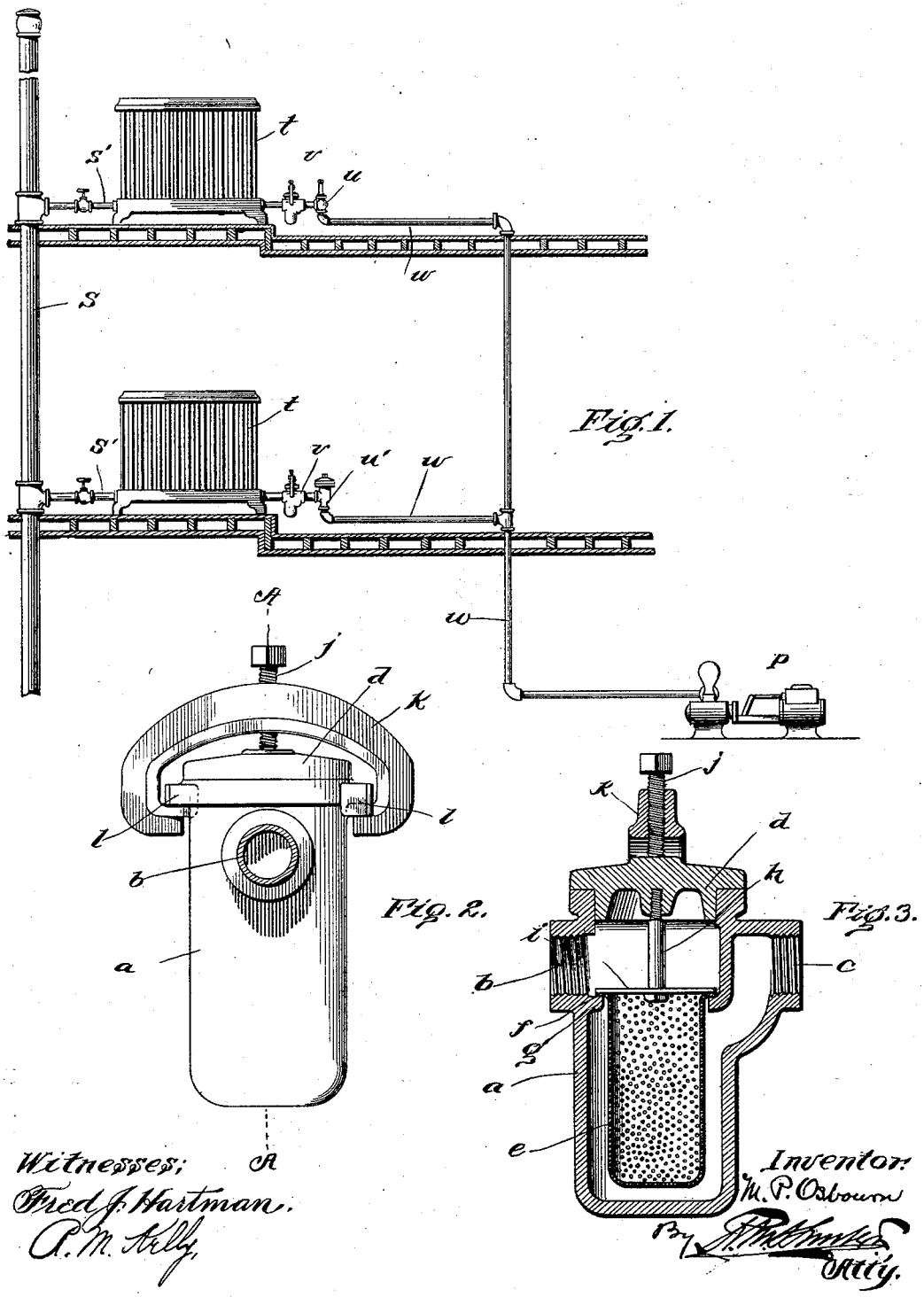
THE NORRIS PETERS CO., PHOTO-LITHO., WASHINGTON, D. C.

UNITED STATES PATENT OFFICE.

MILLARD P. OSBOURN, OF CAMDEN, NEW JERSEY, ASSIGNOR TO AMERICAN STEAM HEATING SPECIALTY COMPANY, A CORPORATION OF NEW JERSEY.

DIRT-TRAP FOR STEAM-HEATING SYSTEMS.

SPECIFICATION forming part of Letters Patent No. 687,384, dated November 26, 1901.

Application filed May 14, 1901. Serial No. 60,172. (No model.)

*To all whom it may concern:*

Be it known that I, MILLARD P. OSBOURN, of the city and county of Camden, in the State of New Jersey, have invented an Improvement in Dirt-Traps for Steam-Heating Systems, &c., of which the following is a specification.

My invention relates to dirt-traps particularly adapted for use in steam-heating systems, &c.; and it consists of the improvements which are fully set forth in the following specification and shown in the accompanying drawings.

While my dirt-trap is especially adapted for use in connection with steam-heating systems to collect foreign matter and dirt that may be present in the water of condensation in the returns, it may be employed in any pipe or conduit to catch dirt or foreign matter contained in water or fluid.

Difficulty has been experienced with dirt-traps owing to the clogging up of the strainer or filter after long use. Such clogging of the strainer prevents the passage of the water and produces an accumulation of large volumes of water back of the trap, which will escape into the room when the trap is opened for the purpose of removing and cleaning the strainer.

It is the object of my invention to enable a passage to be formed for the water about the strainer without opening the trap, so that the accumulation of water caused by the clogged trap may be discharged, and the trap may then be opened to permit the strainer to be removed and cleaned without the escape of any water into the room.

Another object of my invention particularly relating to the employment of my trap in steam-heating systems in which the water of condensation passes through automatic valves is to prevent foreign matter or dirt from passing into the valves and to render the use of strainers or filters in the valves unnecessary.

In the drawings, Figure 1 is a diagrammatic view of a steam-heating system, illustrating the application of my dirt-trap. Fig. 2 is a side elevation of the dirt-trap, and Fig. 3 is a vertical sectional view of the same on the line A A of Fig. 2.

In Fig. 1 I have shown only so much of a steam-heating system as is necessary to enable the purpose and use of my dirt-trap to be understood. The system shown is what is commonly known as a "vacuum" system, in which steam from an exhaust or supply pipe $s$ is supplied to radiators $t$ through branches $s'$ and the air and water of condensation are drawn out from the radiators through automatic valves $u\,u'$ into the returns $w$ by a pump or exhausting device $p$. The dirt-traps $v\,v'$ are interposed in the returns, preferably between the outlets of the radiators and the automatic valves $u\,u'$, so as to catch the dirt and particles of foreign matter that may be present in the water of condensation and prevent such matter entering the valves.

In illustrating the application of my dirt-trap to a system of this kind I do not mean to limit myself in any way to this particular use of the trap, as it may be employed in any system with or without automatic valves or in any pipe or return in which it is desired to trap or catch dirt or other matter that may be present in water or fluid passing through such pipe.

The trap consists of a body $a$, having an inlet $b$ and outlet $c$, a movable cap $d$, and a perforated, reticulated, or porous strainer $e$ interposed between the inlet and outlet and held in place by the cap $d$ in such manner that when the cap is closed tightly the strainer will be held tightly upon its seat, so that the water or fluid must pass through it to the outlet, but when the cap is loosened or partially raised the strainer will be lifted from its seat and a passage or by-pass for the water or fluid will be afforded about the strainer.

In the construction shown the strainer $e$ is of cup shape, provided at its open end with a flange or rim $f$, which rests upon the supporting-seat $g$ within the body, and the open end of the cup-shaped strainer is turned to the inlet $b$.

The cap $d$ fits the open top of the trap-body and is connected with the strainer $e$ in any suitable manner, as by the pin $h$, bolted to the cross-bar $i$, secured to the top of the strainer. The cap may be screwed into the opening in the body; but I prefer to fasten it in place in the manner shown. The cap fits the opening closely and is clamped in place by a set-screw $j$, carried by a yoke $k$, engaging lugs $l$ $l$ on the sides of the trap-body. When the cap is secured tightly in place, as shown in Fig. 3, the strainer $e$ is held tightly upon its seat and the only passage afforded for the water or fluid is through the strainer. If now the strainer becomes clogged with dirt, so that the water cannot pass through it and accumulates on the supply side, the set screw $j$ is loosened and the cap $d$ is lifted to a sufficient extent to raise the strainer $e$ from its seat and open a by-pass or passage-way to the outlet about or outside of the strainer. This will permit the accumulation of water to pass off to the outlet and can be effected without entirely removing the cap $d$ or permitting any of the water to flow out into the building through the open trap. When the water is thus discharged or drained off, the cap may be removed and the strainer may be taken out, cleaned, and replaced. Thus the liability of flooding the building in order to clean out a clogged strainer is entirely avoided.

The use of my dirt-trap in a steam-heating system of the character shown in the drawings is especially beneficial, as it enables the strainers which have heretofore been employed in the automatic or thermostatic valves to be dispensed with. Such strainers could not be removed and cleaned without opening the valve, which not only allowed the accumulation of water to escape, but necessitated the readjustment of the valve when it was put together again.

By arranging my dirt-traps in front of the inlets to the valves, as shown in Fig. 1, not only can the valves be kept free from dirt and the relief of the water be effected without flooding the room, but the removal and cleansing of the dirt-strainers can be effected without touching the automatic valves or effecting their adjustment. For purposes of illustration I have shown two forms of valves in Fig. 1, the valve $u$ being of the thermostatic type—such, e. g., as is shown in the Serrell and Leitch patent, No. 600,653, dated March 15, 1898—and the valve $u'$ being of the automatic pressure-motor type shown in the Donnelly patent, No. 670,893, dated March 26, 1891.

The details of construction shown may be varied without departing from my invention.

What I claim as new, and desire to secure by Letters Patent, is as follows:

1. A dirt-trap for steam-heating systems, &c., consisting of a body having an inlet and an outlet, a strainer movably supported within said body between the inlet and outlet, a movable cap or cover for said body acting upon said strainer to hold it tightly upon its seat when the cap is tightly closed, and means controlled by the cap to automatically raise said strainer from its support when the cap is loosened or raised, whereby a passage may be afforded for the water or fluid outside of said strainer without entirely removing the cap from the body.

2. A dirt-trap for steam-heating systems, &c., consisting of a body having an inlet and an outlet, a strainer movably supported within said body between the inlet and outlet, and a movable cap or cover for said body acting upon said strainer to hold it tightly upon its seat when the cap is tightly closed, and means controlled by said cap or cover and acting on said strainer to lift it from its seat and afford a passage for the water or fluid outside of said strainer without entirely removing the cap or cover.

3. A dirt-trap for steam-heating systems, &c., consisting of a body having an inlet and an outlet, a movable cap or cover for said body, and a strainer movably supported within said body between the inlet and outlet and carried by said cap or cover, said cap or cover acting to hold said strainer firmly upon its seat and to lift it therefrom when the cap or cover is loosened or raised, whereby a passage for water or fluid may be afforded about said strainer without entirely removing the cap or cover from the trap-body.

4. A dirt-trap for steam-heating systems, &c., consisting of a body having an inlet and an outlet, a cup-shaped strainer movably supported within the body between the inlet and outlet with its open end presented toward the inlet, a movable cap or cover acting on said strainer to hold it tightly upon its seat when the cap is tightly closed, and means controlled by the cap to automatically raise said strainer from its support when the cap is loosened or raised, whereby a passage may be afforded for the water or fluid about said strainer without entirely removing the cap from the body of the trap.

5. A dirt-trap for steam-heating systems, &c., consisting of a body having an inlet and an outlet, a strainer movably supported within said body between the inlet and outlet, the removable cap $d$ for the trap-body, the yoke $k$ carried by the trap-body, the screw $j$ carried by the yoke and bearing on the cap, and means controlled by said cap or cover and acting on said strainer to lift it from its seat and afford a passage for the water or fluid outside of said strainer without removing the cap or cover.

In testimony of which invention I have hereunto set my hand.

MILLARD P. OSBOURN.

Witnesses:
FREDERICK KRUEGER,
AUGUST SEEMAN.